US012599069B2

(12) United States Patent
Liu

(10) Patent No.: US 12,599,069 B2
(45) Date of Patent: Apr. 14, 2026

(54) COCOPEAT BASED SUBSTRATE AND ITS MANUFACTURING METHOD

(71) Applicant: UNC NEWTEC LLC, Las Vegas, NV (US)

(72) Inventor: Jie Liu, Beijing (CN)

( * ) Notice: Subject to any disclaimer, the term of this patent is extended or adjusted under 35 U.S.C. 154(b) by 652 days.

(21) Appl. No.: 18/062,013

(22) Filed: Dec. 5, 2022

(65) Prior Publication Data

US 2024/0180089 A1     Jun. 6, 2024

(51) Int. Cl.
| | |
|---|---|
| *A01G 24/28* | (2018.01) |
| *B29C 43/00* | (2006.01) |
| *B29C 43/02* | (2006.01) |
| *B29C 43/52* | (2006.01) |
| *B29K 1/00* | (2006.01) |
| *B29L 31/00* | (2006.01) |
| *C05D 1/00* | (2006.01) |
| *C05G 5/40* | (2020.01) |

(52) U.S. Cl.
CPC ............ *A01G 24/28* (2018.02); *B29C 43/003* (2013.01); *B29C 43/027* (2013.01); *B29C 43/52* (2013.01); *B29K 2001/00* (2013.01); *B29K 2995/006* (2013.01); *B29L 2031/7004* (2013.01); *C05D 1/00* (2013.01); *C05G 5/40* (2020.02)

(58) Field of Classification Search
CPC .... A01G 24/28; B29C 43/003; B29C 43/027; B29C 43/52; B29K 2001/00; B29K 2995/006; B29L 2031/7004; C05D 1/00; C05G 5/40
See application file for complete search history.

(56) References Cited

FOREIGN PATENT DOCUMENTS

CN          109644823 A  *  4/2019  ............ A01G 24/27

OTHER PUBLICATIONS

Machine Translation of Huang CN 109644823 A (Year: 2019).*

* cited by examiner

*Primary Examiner* — Amber R Orlando
*Assistant Examiner* — Heather Elise Rainbow
(74) *Attorney, Agent, or Firm* — Tsz Lung Yeung

(57) ABSTRACT

A cocopeat substrate and its manufacturing method, includes the steps of: (a) mixing raw materials, part by mass, of 70-75 parts of cocopeat, 0-0.5 parts of pH regulator, 0-0.5 parts of rooting agent, 25-30 parts of modified diisocyanate and 20-35 parts of water uniformly by a mixer to form a premixed material; (b) immediately filling the premixed material into a mold and carrying out hot press curing to obtain a cured cocopeat substrate; and (c) drying with hot air to remove excess moisture, and then air cooling under room condition. The cocopeat substrate has an EC value less than or equal to 1.0, a pH value of 5.0-6.5, a porosity of 80-85%, and a density of 0.18-0.25 $g/cm^3$. The cocopeat substrate has a truncated pyramid structure and a planting hole functioning as a natural planting pot with slow natural decomposition rate, readily for use directly for growing seedlings.

12 Claims, 2 Drawing Sheets

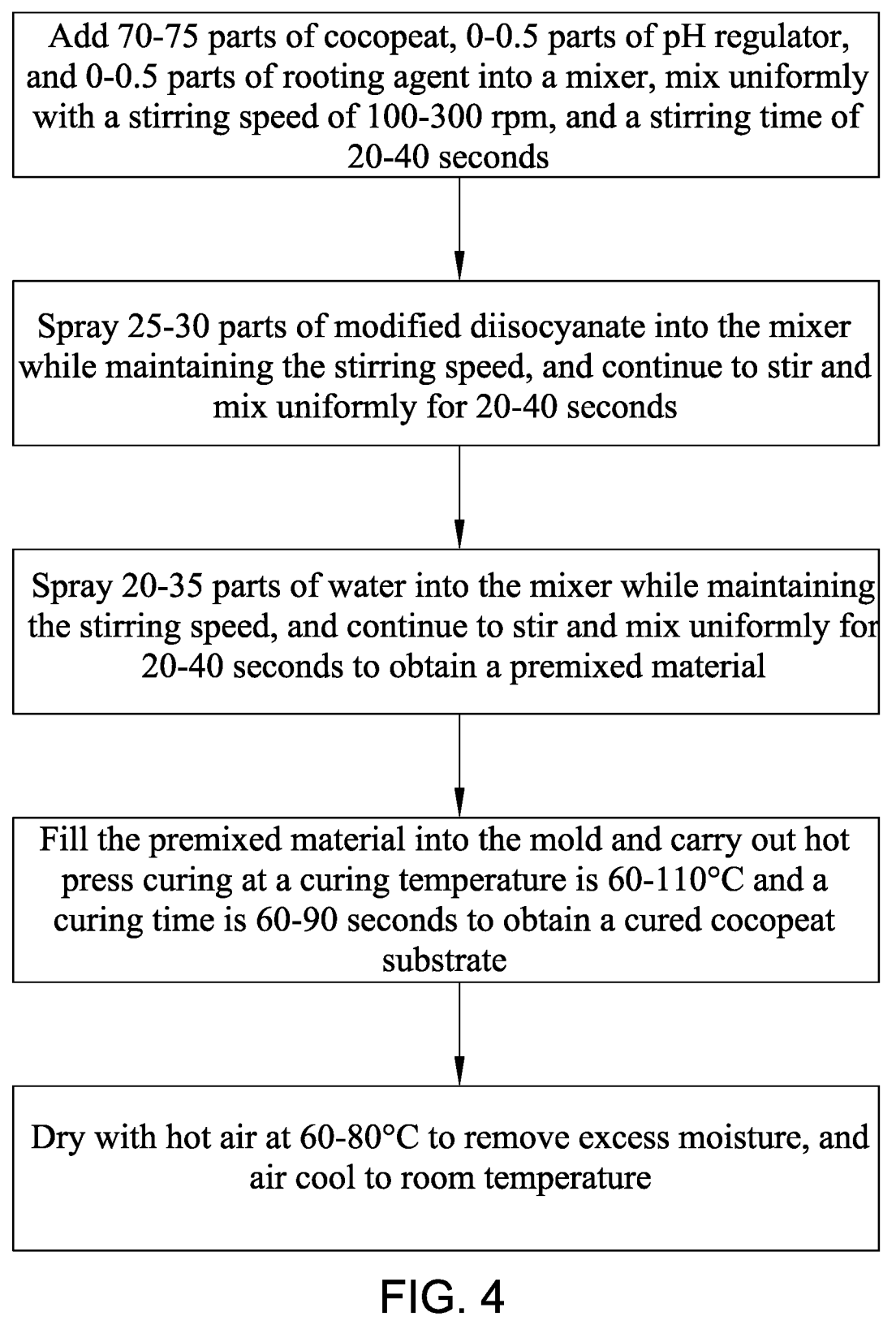

Add 70-75 parts of cocopeat, 0-0.5 parts of pH regulator, and 0-0.5 parts of rooting agent into a mixer, mix uniformly with a stirring speed of 100-300 rpm, and a stirring time of 20-40 seconds Spray 25-30 parts of modified diisocyanate into the mixer while maintaining the stirring speed, and continue to stir and mix uniformly for 20-40 seconds Spray 20-35 parts of water into the mixer while maintaining the stirring speed, and continue to stir and mix uniformly for 20-40 seconds to obtain a premixed material Fill the premixed material into the mold and carry out hot press curing at a curing temperature is 60-110°C and a curing time is 60-90 seconds to obtain a cured cocopeat substrate Dry with hot air at 60-80°C to remove excess moisture, and air cool to room temperature

FIG. 4

COCOPEAT BASED SUBSTRATE AND ITS MANUFACTURING METHOD

BACKGROUND OF THE PRESENT INVENTION

Field of Invention

The present invention relates to plant cultivation, and more particularly to a cocopeat based substrate for crop cultivation and its preparation method thereof.

Description of Related Arts

In the field of cultivation in agriculture, a common practice is continuous cultivation of a single crop in a specific piece of farm year after year. In other words, a single crop or plant is usually cultivated in the same location continuously so as to maximize agricultural efficiency. However, since a particular plant or crop will have a tendency to absorb certain components of nutrients, this conventional practice with lead to the excessive consumption of certain components of nutrients in the soil while other remaining components of nutrients is relatively excessively left in the soil. Therefore, an imbalanced soil content will be resulted. Also, due to the effect of biological heredity and variation, a large number of soil-borne infectious diseases and drugs resistance may occur, and this leads to a large reduction in crop production or even extinction of a particular crop. This is the so-called continuous cropping obstacle.

Also, in order to avoid the quality and safety problems caused by the abuse of pesticides and chemical fertilizers in the soil, it is a feasible method to use organic substrates for growing crops, and to plant the crops in isolation from the field soil. In other words, soilless cultivation is one of the feasible method to solve the quality and safety problems. As a result, the market demand for soilless culture substrates is also increasing dramatically.

Coconut peat or cocopeat is the fiber powder from coconut husk, which is a by-product or waste product of coconut after processing. Cocopeat is a pure natural organic medium that falls off from coconut husk fiber during coconut processing. Coconut peat has good water retention, can fully retain water and nutrients, reduce the loss of water and nutrients, and is conducive to the good absorption of nutrients and water by plant roots during the growth process, thereby can facilitate the growth of plants. Coconut peat also has good air permeability, thus can effectively prevent root corrosion, promote the growth of plant roots, and protect the soil and avoid the soil to become slurry. Also cocopeat has a slow natural decomposition rate, which is beneficial to prolong its service life.

Coconut peat is a good organic substrate for soilless cultivation. In order to facilitate storage and transportation, there are exiting technologies that compress coconut peat after high temperature sterilization and desalination to make it into cocopeat brick. However, 3 to 6 times of water is needed to be added into the cocopeat bricks to form wet loose cocopeat before it can be used, and the cocopeat needs to be used in conjunction with containers such as plastic basins and foam boxes, therefore this produces a large amount of waste and causes white pollution to the environment.

SUMMARY

Implementations of the present disclosure provide a cocopeat substrate for agricultural cultivation and its manufacturing method thereof. The cocopeat substrate is readily used for agricultural cultivation directly without the need of soaking or pre-processing, and is especially suitable for use in soilless cultivation of crops. It has the advantages of root fixing, fertilizer saving, labor saving and easy management, and can effectively block the spread of soil-borne diseases.

In one aspect of the present disclosure, it provides a cocopeat substrate for agricultural cultivation. The cocopeat substrate is prepared by the following raw materials, part by mass: 70-75 parts of cocopeat, 25-30 parts of modified diisocyanate, 0-0.5 part of pH regulator, 0-0.5 part of rooting agent, and 20-35 parts of water. The modified diisocyanate is prepared by polymerizing diisocyanate and polyoxyethylene ether with a molar ratio of 1:(1-1.5) at a polymerization temperature of 50~60° C. for a polymerization reaction time of 5-6 hours.

According to the preferred embodiment of the present invention, the cocopeat substrate includes cocopeat as the main component, modified diisocyanate as the binder to bind the cocopeat together, and water as the wetting agent and foaming agent. Water and modified diisocyanate produce a curing reaction and release a large amount of carbon dioxide gas, and then a planting container with a certain strength and softness is formed. At the same time, the cocopeat substrate has better water absorption and permeability, no soaking in water is needed before use, and can be directly used for planting crops. It has the advantages of root fixing, fertilizer saving, labor saving and easy management, and can effectively block the spread of soil-borne diseases. Also, the cocopeat substrate can be directly used as a planting container, and there is no need to use additional containers such as plastic flowerpots, and the secondary pollution caused by the use of plastic flowerpots is avoided.

In some embodiments, the raw materials cocopeat is processed by high-temperature sterilization and desalination treatment, with an EC value of ≤1.0 and a water content ≤40%.

In some embodiments, the diisocyanate is selected from one or more of: toluene diisocyanate (TDI), isophorone diisocyanate (IPDI), diphenylmethane diisocyanate (MDI), dicyclohexylmethane diisocyanate (HMDI), hexamethylene diisocyanate (HDI), Lysine diisocyanate (LDI).

In some embodiments, the polyoxyethylene ether is one or both of fatty alcohol polyoxyethylene ether (AEO), and nonylphenol polyoxyethylene ether (NP-10).

In some embodiments, the pH regulator is selected from one or more of citric acid, potassium citrate, and potassium carbonate.

In some embodiments, the rooting agent is one or more of salicylic acid, potassium salicylate, salicylamide, and acetylsalicylic acid.

In some embodiments, the cocopeat substrate is prepared by a method which comprises the following steps:

(a) adding 70-75 parts of cocopeat, 0-0.5 parts of pH regulator, and 0-0.5 parts of rooting agent into a mixer, mixing uniformly with a stirring speed of 100-300 rpm, and a stirring time of 20-40 seconds;

(b) spraying evenly 25-30 parts of modified diisocyanate into the mixer while maintaining the stirring speed, and continuing to stir and mix uniformly for an additional 20-40 seconds;

(c) spraying evenly 20-35 parts of water into the mixer while maintaining the stirring speed, and continuing to stir and mix uniformly for an additional 20-40 seconds to obtain a premixed material;

(d) filling the premixed material into the mold quickly and carrying out hot press curing at a curing temperature is 60-110° C. and a curing time is 60-90 seconds to obtain a cured cocopeat substrate; and (e) drying with hot air at 60-80° C. to remove excess moisture, and air cooling to room temperature to obtain the finished product of cocopeat substrate.

In some embodiments, the cocopeat substrate has an EC value ≤1.0, a pH value of 5.0-6.5, a porosity of 80-85%, and a density of 0.18-0.25 g/cm³.

In some embodiments, the cocopeat substrate has a truncated square pyramid structure or a truncated rectangular pyramid structure, defining a top side and a bottom side, and a planting hole provided on the top side defining an elongated planting groove extended downwardly for inserting and positioning a seedling therein.

In some embodiments, the planting hole is a square hole with a dimension of 3 cm by 3 cm and a depth of 3 cm.

In another aspect of the present disclosure, it provides a method of manufacturing a cocopeat substrate, comprising the following steps:

(a) adding 70-75 parts of cocopeat, 0-0.5 parts of pH regulator, and 0-0.5 parts of rooting agent into a mixer, mixing uniformly with a stirring speed of 100-300 rpm, and a stirring time of 20-40 seconds;

(b) spraying evenly 25-30 parts of modified diisocyanate into the mixer while maintaining the stirring speed, and continuing to stir and mix uniformly for an additional 20-40 seconds;

(c) spraying evenly 20-35 parts of water into the mixer while maintaining the stirring speed, and continuing to stir and mix uniformly for an additional 20-40 seconds to obtain a premixed material;

(d) immediately after step (c), filling the premixed material into the mold as quick as possible and carrying out hot press curing at a curing temperature is 60-110° C. and a curing time is 60-90 seconds to obtain a cured cocopeat substrate; and (e) drying with hot air at a drying temperature of 60-80° C. to remove excess moisture, and air cooling to room temperature to obtain the finished product of cocopeat substrate.

According to this embodiment, the manufacturing method of the cocopeat substrate adopts a fast and high-speed mixer to mix the raw materials, so the raw materials are quickly and fully mixed uniformly and then press molding is carried out quickly so as to minimize the ineffective curing before hot press molding, and to reduce the amount of the modified diisocyanate glue.

A large number of experiments have been carried out and have shown that the method of the present invention adopts suitable medium-temperature hot-pressing for fast curing, and process of curing and molding are quick, which only takes about 60-90 seconds. Compared with room temperature curing (room temperature curing takes more than 20 hours), the curing time is greatly shortened, the production efficiency is improved, and the resulting product prepared from medium-temperature hot press curing has higher strength and greater elasticity than those prepared from room temperature curing.

In some embodiments, the mixer in step (a) to (c) is a horizontal double-shaft ribbon mixer.

According to the present invention, it also provides an application of the cocopeat substrate in the cultivation of crops. The cocopeat substrate is used for the cultivation of crop seedlings.

The beneficial effects of the present invention are as follows:

According to the present invention, the cocopeat substrate uses cocopeat as the main component, and modified diisocyanate (a prepolymer produced by incomplete polymerization of diisocyanate in excess and polyoxyethylene ether) as binding agent to bind cocopeat together. Water is used as a wetting and foaming agent. Water and modified diisocyanate produce a curing reaction which releases a large amount of carbon dioxide gas to form a planting container with a certain strength and softness. The resulting planting container has better water absorption and permeability, no soaking in water is needed before use, and can be readily and directly used for planting crops. It has the advantages of root fixing, fertilizer saving, labor saving and easy management, and can effectively block the spread of soil-borne diseases. Also, the cocopeat substrate can be directly used as a planting container, and there is no need to use additional containers such as plastic flowerpots, and the secondary pollution caused by the use of plastic flowerpots is avoided.

(2) According to the present invention, the cocopeat substrate is utilized as crop cultivation pot and as organic substrate for crops. In the crop growing process, due to the effect of microbial degradation, some parts of the cocopeat substrate are converted into organic fertilizer directly absorbed by the crops, and providing organic nutrients for the crops continuously.

(3) According to the present invention, the manufacturing method of the cocopeat substrate adopts a fast and high-speed mixer to mix the raw materials, so the raw materials are quickly and fully mixed uniformly and then press molding is carried out quickly so as to minimize the ineffective curing before hot press molding, and to reduce the amount of the modified diisocyanate glue. Also, a large number of experiments have been carried out and have shown that the method of the present invention adopts suitable medium-temperature hot-pressing for fast curing, and process of curing and molding are quick, which only takes about 60-90 seconds. Compared with room temperature curing (room temperature curing takes more than 20 hours), the curing time is greatly shortened, the production efficiency is improved, and the resulting product prepared from medium-temperature hot press curing has higher strength and greater elasticity than those prepared from room temperature curing.

This summary presented above is provided merely to introduce certain concepts and not to identify any key or essential features of the claimed subject matter.

BRIEF DESCRIPTION OF THE DRAWINGS

FIG. 4 is a flowchart showing the manufacturing method of the cocopeat substrate according to the preferred embodiment of the present invention.

DETAILED DESCRIPTION OF THE PREFERRED EMBODIMENT

The following detailed description of the embodiments is the preferred mode of carrying out the present disclosure.

The description is not to be taken in any limiting sense. It is presented for the purpose of illustrating the general principles of embodiments of the present disclosure.

It should be appreciated that the terms "top", "bottom", in the following description refer to the orientation or positioning relationship in the accompanying drawings for easy understanding of embodiments of the present disclosure without limiting the actual location or orientation of embodiments of the present disclosure. Therefore, the above terms should not be an actual location limitation of the elements of embodiments of the present disclosure.

Figures 1, 2:
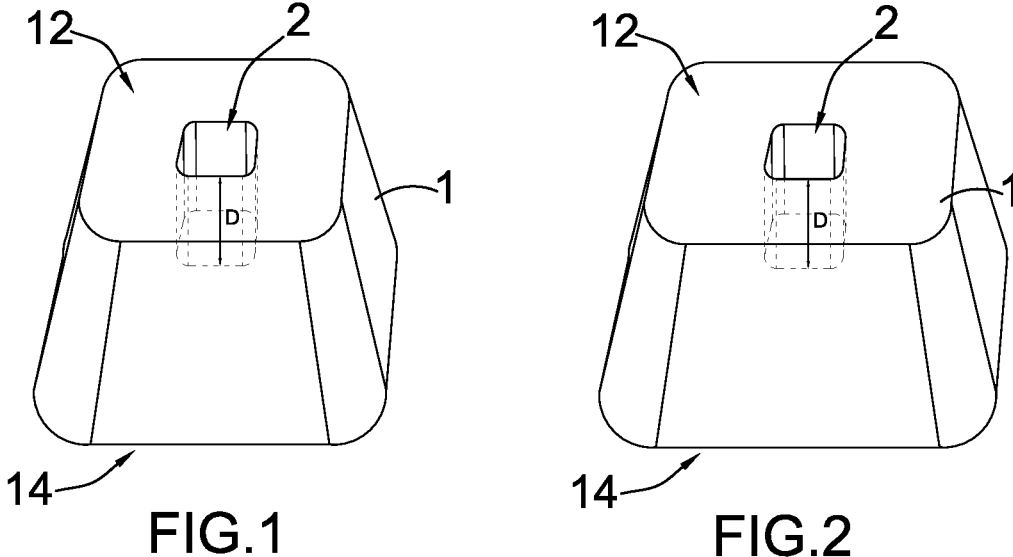
FIG. 1 is a schematic structural illustration of the cocopeat substrate according to a preferred embodiment of the present invention.
FIG. 2 is another schematic structural illustration of the cocopeat substrate according to the preferred embodiment of the present invention.
Figure 3:
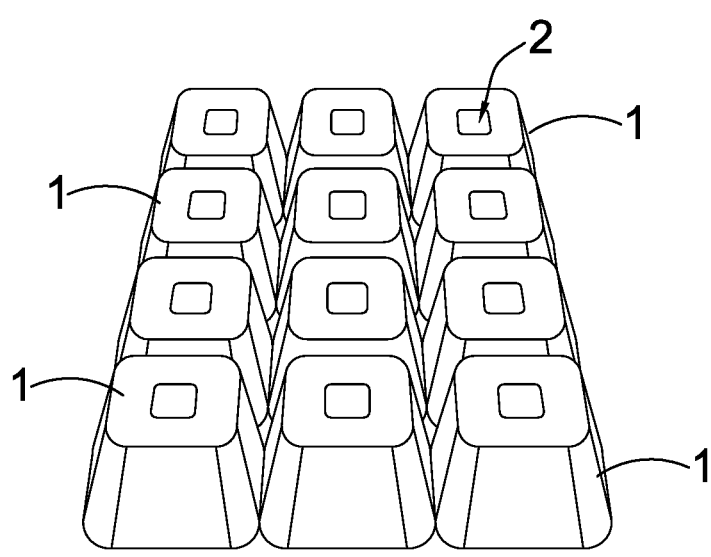
FIG. 3 is a schematic illustration of the application of cocopeat substrates in the field with certain spacing according to the preferred embodiment of the present invention.

Referring to FIGS. 1 to 3 of the drawings, according to one aspect of a preferred embodiment of the present disclosure, a cocopeat substrate for agricultural cultivation is provided. The cocopeat substrate is prepared by using the following raw materials, part by mass: 70-75 parts of cocopeat, 25-30 parts of modified diisocyanate, 0-0.5 part of pH regulator, 0-0.5 part of rooting agent, and 20-35 parts of water. The modified diisocyanate is prepared by polymerizing diisocyanate and polyoxyethylene ether with a molar ratio of 1:(1-1.5) at a polymerization temperature of 50~60° C. for a polymerization reaction time of 5-6 hours.

For examples, in the raw materials, the cocopeat can be 70 parts, 71 parts, 72.5 parts, 73 parts, 74 parts, 75 parts, and etc.; the modified diisocyanate can be 25 parts, 26 parts, 27 parts, 28.5 parts, 29 parts, 30 parts, and etc.; the pH regulator can be 0 part, 0.1 part, 0.2 part, 0.25 part, 0.3 part, 0.4 part, 0.5 part and etc.; and the rooting agent can be 0 parts, 0.1 parts, 0.2 parts, 0.25 parts, 0.3 parts, 0.4 parts, 0.5 parts, and etc.

When the modified diisocyanate is prepared by polymerizing diisocyanate and polyoxyethylene ether, the molar ratio of diisocyanate and polyoxyethylene ether can be 1:1, 1:1.1, 1:1.2, 1:1.3, 1:1.4, 1:1.5, and etc.; the polymerization temperature can be 50° C., 52° C., 55° C., 57° C., 60° C., and etc.; the polymerization reaction time can be 5 h, 5.2 h, 5.5 h, 5.8 h, 6 h, and etc.

According to the preferred embodiment of the present invention, the cocopeat substrate uses cocopeat as the main component, and modified diisocyanate (a prepolymer produced by incomplete polymerization of diisocyanate in excess and polyoxyethylene ether) as binding agent to bind cocopeat together. Water is used as a wetting and foaming agent. Water and modified diisocyanate produce a curing reaction which releases a large amount of carbon dioxide gas to form a planting container with a certain strength and softness. The resulting planting container has better water absorption and permeability, no soaking in water is needed before use, and can be readily and directly used for planting crops. It has the advantages of root fixing, fertilizer saving, labor saving and easy management, and can effectively block the spread of soil-borne diseases. Also, the cocopeat substrate can be directly used as a planting container, and there is no need to use additional containers such as plastic flowerpots, and the secondary pollution caused by the use of plastic flowerpots is avoided.

According to the preferred embodiment of the present invention, the cocopeat substrate is utilized as crop cultivation pot and as organic substrate for crops. In the crop growing process, due to the effect of microbial degradation, some parts of the cocopeat substrate are converted into organic fertilizer directly absorbed by the crops, and providing organic nutrients for the crops continuously.

In some embodiments, the raw materials cocopeat is processed by high-temperature sterilization and desalination treatment, with an EC value of ≤1.0 and a water content ≤40%.

In some embodiments, the diisocyanate is selected from one or more of: toluene diisocyanate (TDI), isophorone diisocyanate (IPDI), diphenylmethane diisocyanate (MDI), dicyclohexylmethane diisocyanate (HMDI), hexamethylene diisocyanate (HDI), Lysine diisocyanate (LDI).

In some embodiments, the polyoxyethylene ether is one or both of fatty alcohol polyoxyethylene ether (AEO), and nonylphenol polyoxyethylene ether (NP-10).

In some embodiments, the pH regulator is selected from one or more of citric acid, potassium citrate, and potassium carbonate.

In some embodiments, the rooting agent is one or more of salicylic acid, potassium salicylate, salicylamide, and acetylsalicylic acid.

In some embodiments, a the cocopeat substrate is prepared by a manufacturing method which comprises the following steps:

(a) adding 70-75 parts of cocopeat, 0-0.5 parts of pH regulator, and 0-0.5 parts of rooting agent into a mixer, mixing uniformly with a stirring speed of 100-300 rpm, and a stirring time of 20-40 seconds;

(b) spraying evenly 25-30 parts of modified diisocyanate into the mixer while maintaining the stirring speed, and continuing to stir and mix uniformly for an additional 20-40 seconds;

(c) spraying evenly 20-35 parts of water into the mixer while maintaining the stirring speed, and continuing to stir and mix uniformly for an additional 20-40 seconds to obtain a premixed material;

(d) filling the premixed material into the mold quickly and carrying out hot press curing at a curing temperature is 60-110° C. and a curing time is 60-90 seconds to obtain a cured cocopeat substrate; and (e) drying with hot air at 60-80° C. to remove excess moisture, and air cooling to room temperature to obtain the finished product of cocopeat substrate.

In some embodiments, the cocopeat substrate has an EC value ≤1.0, a pH value of 5.0-6.5, a porosity of 80-85%, and a density of 0.18-0.25 g/cm³.

The cocopeat substrate 1 has a self-supporting structure such that the cocopeat substrate can position and support on the ground by itself. Therefore, the cocopeat substrate 1 can be used as a planting pot to place on top of the ground for growing crops. Preferably, as shown in FIG. 1 and FIG. 2 of the drawings, the cocopeat substrate 1 has a truncated pyramid structure such as a truncated square pyramid structure or a truncated rectangular pyramid structure, defining a top side 12 and a bottom side 14, and a planting hole 2 extended from the top side 12 downwardly towards the bottom side 14 defining a depth D arranged for inserting and positioning a seedling therein. The cocopeat substrate 1 can serve as a planting pot on the field by itself with a central planting hole 2 for positioning the seedling, and can be arranged on the field in such a manner that every seedling is evenly spaced apart at a distance from another seedling, which is shown in FIG. 3 of the drawings.

In some embodiments, the planting hole 2 is a square hole with a dimension of 3 cm by 3 cm and a depth of 3 cm.

In another aspect of the present disclosure, it provides a method of manufacturing a cocopeat substrate, comprising the following steps:

(a) adding 70-75 parts of cocopeat, 0-0.5 parts of pH regulator, and 0-0.5 parts of rooting agent into a mixer, mixing uniformly with a stirring speed of 100-300 rpm, and a stirring time of 20-40 seconds;

(b) spraying evenly 25-30 parts of modified diisocyanate into the mixer while maintaining the stirring speed, and continuing to stir and mix uniformly for an additional 20-40 seconds;

(c) spraying evenly 20-35 parts of water into the mixer while maintaining the stirring speed, and continuing to stir and mix uniformly for an additional 20-40 seconds to obtain a premixed material;

(d) filling the premixed material into the mold quickly and carrying out hot press curing at a curing temperature is 60-110° C. and a curing time is 60-90 seconds to obtain a cured cocopeat substrate; and (e) drying with hot air at 60-80° C. to remove excess moisture, and air cooling to room temperature to obtain the finished product of cocopeat substrate.

For examples, in step (a), the stirring speed can be 100 rpm, 120 rpm, 150 rpm, 200 rpm, 220 rpm, 250 rpm, 280 rpm, 300 rpm, and etc.

The stirring time in step (a) can be 20 seconds, 25 seconds, 30 seconds, 35 seconds, 40 seconds, and etc.

The stirring time in step (b) can be 20 seconds, 25 seconds, 30 seconds, 35 seconds, 40 seconds, and etc.

The stirring time in step (c) can be 20 seconds, 25 seconds, 30 seconds, 35 seconds, 40 seconds, and etc.

The curing temperature in step (d) can be 60° C., 65° C., 70° C., 75° ° C., 80° C., 90° C., 95° C., 100° C., 110° C., and etc. The curing time in step (d) can be 60 seconds, 65 seconds, 70 seconds, 75 seconds, 90 seconds and etc.

The drying temperature in step (e) can be 60° C., 65° ° C., 70° C., 75° C., 80° C., and etc.

According to the preferred embodiment of the present invention, the manufacturing method of the cocopeat substrate adopts a fast and high-speed mixer to mix the raw materials, so the raw materials are quickly and fully mixed uniformly and then press molding is carried out quickly so as to minimize the ineffective curing before hot press molding, and to reduce the amount of the modified diisocyanate glue. Also, a large number of experiments have been carried out and have shown that the method of the present invention adopts suitable medium-temperature hot-pressing for fast curing, and process of curing and molding are quick, which only takes about 60-90 seconds. Compared with room temperature curing (room temperature curing takes more than 20 hours), the curing time is greatly shortened, the production efficiency is improved, and the resulting product prepared from medium-temperature hot press curing has higher strength and greater elasticity than those prepared from room temperature curing.

In some embodiments, the mixer in step (a) to (c) is a horizontal double-shaft ribbon mixer.

According to the present invention, it also provides an application of the cocopeat substrate in the cultivation of crops. The cocopeat substrate is used for the cultivation of crop seedlings.

It can be understood that the crops described in the present invention refer to plants cultivated in agriculture, including but not limited to: tomatoes, cucumbers, eggplants, peppers, loofah, strawberries, watermelons, muskmelons and the like.

The preferred embodiment of the present invention is further described in the following examples. If the conditions is not specified in the specific example, then it is carried out according to the conventional conditions. The different raw materials of the cocopeat substrate used in the specific example is purchased from the commercial market. The parts in the following examples 1-5 are all parts by mass.

Example 1

A manufacturing method of a cocopeat substrate for agricultural cultivation, comprising the steps of:

(a) adding 75 parts of cocopeat (which is processed by high temperature sterilization and desalination treatment, EC value ≤1.0, water content ≤40%), 0.1 parts of citric acid, and 0.1 parts of potassium salicylate into a horizontal double-shaft ribbon mixer, mixing uniformly with a stirring speed of 150 rpm, and a stirring time of 25 seconds;

(b) spraying evenly 26 parts of modified diisocyanate into the mixer while maintaining the stirring speed, and continuing to stir and mix uniformly for 25 seconds;

(c) spraying evenly 25 parts of water into the mixer while maintaining the stirring speed, and continuing to stir and mix uniformly for 25 seconds to obtain a premixed material;

(d) filling the premixed material into the mold quickly and carrying out hot press curing at a curing temperature is 80° C. and a curing time is 90 seconds to obtain a cured cocopeat substrate; and (e) drying with hot air at 70° C., to remove excess moisture, and air cooling to room temperature to obtain the finished product of cocopeat substrate.

The modified diisocyanate is prepared by polymerizing toluene diisocyanate and fatty alcohol polyoxyethylene ether (AEO-9) at a molar ratio of 1:1.5 at 55° C. for 5 hours.

The finished product of cocopeat substrate prepared by the method in Example 1 has an EC value of 0.05, a pH value of 5.8, a porosity of 80%, and a density of 0.21 g/cm$^3$.

The cocopeat substrate has a truncated square pyramid structure defining a top side and a bottom side, and a planting hole extended from the top side downwardly towards the bottom side defining a depth for inserting and positioning a seedling therein. The planting hole is a square hole with a dimension of 3 cm by 3 cm and a depth of 3 cm.

Example 2

A manufacturing method of a cocopeat substrate for agricultural cultivation, comprising the steps of:

(a) adding 75 parts of cocopeat (which is processed by high temperature sterilization and desalination treatment, EC value ≤1.0, water content ≤40%), 0.2 parts of potassium carbonate, and 0.1 parts of potassium salicylate into a horizontal double-shaft ribbon mixer, mixing uniformly with a stirring speed of 180 rpm, and a stirring time of 20 seconds;

(b) spraying evenly 28 parts of modified diisocyanate into the mixer while maintaining the stirring speed, and continuing to stir and mix uniformly for 20 seconds;

(c) spraying evenly 28 parts of water into the mixer while maintaining the stirring speed, and continuing to stir and mix uniformly for 20 seconds to obtain a premixed material;

(d) filling the premixed material into the mold quickly and carrying out hot press curing at a curing temperature is 70° C. and a curing time is 90 seconds to obtain a cured cocopeat substrate; and (e) drying with hot air at 80° ° C., to remove excess moisture, and air cooling to room temperature to obtain the finished product of cocopeat substrate.

The modified diisocyanate is prepared by polymerizing toluene diisocyanate and fatty alcohol polyoxyethylene ether (AEO-9) at a molar ratio of 1:1.3 at 60° C. for 5.5 hours.

The finished product of cocopeat substrate prepared by the method in Example 2 has an EC value of 0.08, a pH value of 6.5, a porosity of 85%, and a density of 0.23 g/cm³.

The cocopeat substrate has a truncated square pyramid structure defining a top side and a bottom side, and a planting hole extended from the top side downwardly towards the bottom side defining a depth for inserting and positioning a seedling therein. The planting hole is a square hole with a dimension of 3 cm by 3 cm and a depth of 3 cm.

Example 3

A manufacturing method of a cocopeat substrate for agricultural cultivation, comprising the steps of:

(a) adding 70 parts of cocopeat (which is processed by high temperature sterilization and desalination treatment, EC value ≤1.0, water content ≤40%), 0.1 parts of citric acid, and 0.2 parts of salicylamide into a horizontal double-shaft ribbon mixer, mixing uniformly with a stirring speed of 200 rpm, and a stirring time of 30 seconds;

(b) spraying evenly 26 parts of modified diisocyanate into the mixer while maintaining the stirring speed, and continuing to stir and mix uniformly for 30 seconds;

(c) spraying evenly 30 parts of water into the mixer while maintaining the stirring speed, and continuing to stir and mix uniformly for 30 seconds to obtain a premixed material;

(d) filling the premixed material into the mold quickly and carrying out hot press curing at a curing temperature is 100° C. and a curing time is 60 seconds to obtain a cured cocopeat substrate; and (e) drying with hot air at 70° C. to remove excess moisture, and air cooling to room temperature to obtain the finished product of cocopeat substrate.

The modified diisocyanate is prepared by polymerizing toluene diisocyanate and fatty alcohol polyoxyethylene ether (AEO-9) at a molar ratio of 1:1.3 at 60° C. for 5.5 hours.

The finished product of cocopeat substrate prepared by the method in Example 3 has an EC value of 0.08, a pH value of 5.0, a porosity of 81%, and a density of 0.20 g/cm³.

The cocopeat substrate has a truncated square pyramid structure defining a top side and a bottom side, and a planting hole extended from the top side downwardly towards the bottom side defining a depth for inserting and positioning a seedling therein. The planting hole is a square hole with a dimension of 3 cm by 3 cm and a depth of 3 cm.

Example 4

A manufacturing method of a cocopeat substrate for agricultural cultivation, comprising the steps of:

(a) adding 75 parts of cocopeat (which is processed by high temperature sterilization and desalination treatment, EC value ≤1.0, water content ≤40%), and 0.2 parts of potassium salicylate into a horizontal double-shaft ribbon mixer, mixing uniformly with a stirring speed of 250 rpm, and a stirring time of 25 seconds;

(b) spraying evenly 30 parts of modified diisocyanate into the mixer while maintaining the stirring speed, and continuing to stir and mix uniformly for 25 seconds;

(c) spraying evenly 30 parts of water into the mixer while maintaining the stirring speed, and continuing to stir and mix uniformly for 25 seconds to obtain a premixed material;

(d) filling the premixed material into the mold quickly and carrying out hot press curing at a curing temperature is 100° C. and a curing time is 50 seconds to obtain a cured cocopeat substrate; and (e) drying with hot air at 80° C. to remove excess moisture, and air cooling to room temperature to obtain the finished product of cocopeat substrate.

The modified diisocyanate is prepared by polymerizing toluene diisocyanate and fatty alcohol polyoxyethylene ether (AEO-9) at a molar ratio of 1:1.5 at 55° C. for 5 hours.

The finished product of cocopeat substrate prepared by the method in Example 3 has an EC value of 0.08, a pH value of 6.4, a porosity of 83%, and a density of 0.22 g/cm³.

The cocopeat substrate has a truncated square pyramid structure defining a top side and a bottom side, and a planting hole extended from the top side downwardly towards the bottom side defining a depth for inserting and positioning a seedling therein. The planting hole is a square hole with a dimension of 3 cm by 3 cm and a depth of 3 cm.

Example 5

A manufacturing method of a cocopeat substrate for agricultural cultivation, comprising the steps of:

(a) adding 75 parts of cocopeat (which is processed by high temperature sterilization and desalination treatment, EC value ≤1.0, water content ≤40%), and 0.3 parts of potassium carbonate into a horizontal double-shaft ribbon mixer, mixing uniformly with a stirring speed of 150 rpm, and a stirring time of 35 seconds;

(b) spraying evenly 25 parts of modified diisocyanate into the mixer while maintaining the stirring speed, and continuing to stir and mix uniformly for 35 seconds;

(c) spraying evenly 28 parts of water into the mixer while maintaining the stirring speed, and continuing to stir and mix uniformly for 35 seconds to obtain a premixed material;

(d) filling the premixed material into the mold quickly and carrying out hot press curing at a curing temperature is 90° C. and a curing time is 80 seconds to obtain a cured cocopeat substrate; and (e) drying with hot air at 70° ° C., to remove excess moisture, and air cooling to room temperature to obtain the finished product of cocopeat substrate.

The modified diisocyanate is prepared by polymerizing toluene diisocyanate and fatty alcohol polyoxyethylene ether (AEO-9) at a molar ratio of 1:1.5 at 60° C. for 5 hours.

The finished product of cocopeat substrate prepared by the method in Example 3 has an EC value of 0.06, a pH value of 6.5, a porosity of 80%, and a density of 0.19 g/cm³.

The cocopeat substrate has a truncated square pyramid structure defining a top side and a bottom side, and a planting hole extended from the top side downwardly towards the bottom side defining a depth for inserting and positioning a seedling therein. The planting hole is a square hole with a dimension of 3 cm by 3 cm and a depth of 3 cm.

Application Test

The cocopeat substrate prepared from Example 1 is applied for planting pepper.

Experimental Group:

The cocopeat substrate is placed on the ground of a greenhouse with a certain spacing, pepper seedlings are transplanted into the planting holes of the cocopeat substrate, drip irrigation needles are inserted, and the fertilization and watering are carried out according to the standard conventional method.

Results: The seedlings grow vigorously directly. No back seedling phenomenon and no soil-borne diseases is observed.

Control Group:

The growing of pepper seedlings in this control group and the above experimental group is carried out at the same time. In the control group, pepper seedlings are directly transplanted into the greenhouse field, drip irrigation needles are inserted, and the fertilization and watering The pepper seedlings are carried out according to the standard conventional method.

Results: The seedlings grow. But some show bending and unhealthy growth phenomenon, some withering and insect pests are observed.

Embodiments of the present disclosure, while illustrated and described in terms of disclosed embodiments and several alternatives, is not limited to the particular description contained in this specification. Additional alternative or equivalent components could also be used to practice embodiments of the present disclosure.

What is claimed is:

1. A manufacturing method of a cocopeat substrate, comprising the steps of:

(a) mixing raw materials, part by mass, of 70-75 parts of cocopeat, 0-0.5 parts of pH regulator, 0-0.5 parts of rooting agent, 25-30 parts of modified diisocyanate and 20-35 parts of water uniformly by a mixer with a stirring speed of 100-300 rpm to form a premixed material;

(b) immediately after the raw materials are mixed uniformly in step (a) to form the premixed material, filling the premixed material into a mold and carrying out hot press curing at a curing temperature of 60-110° C. and a curing time of 60-90 seconds to obtain a cured cocopeat substrate; and (c) drying with hot air at a drying temperature of 60-80° ° C. to remove excess moisture, and then air cooling under room condition to obtain a finished product of cocopeat substrate, wherein the finished product of cocopeat substrate has an EC value less than or equal to 1.0, a pH value of 5.0-6.5, a porosity of 80-85%, and a density of 0.18-0.25 g/cm$^3$.

2. The manufacturing method of a cocopeat substrate according to claim 1, wherein in step (a), the cocopeat, the pH regulator and the rooting agent are mixed uniformly in the mixer for a first stirring time of 20-40 seconds to form a first mixture, then the modified diisocyanate is sprayed to the mixer while the mixer is set at the same stirring speed and a stirring time of 20-40 seconds, then the water is sprayed to the mixer while the mixer is set at the same stirring speed and a stirring time of 20-40 seconds.

3. The manufacturing method of a cocopeat substrate according to claim 2, wherein the pH regulator is one or more selected from the group consisting of: citric acid, potassium citrate, and potassium carbonate.

4. The manufacturing method of a cocopeat substrate according to claim 3, wherein the rooting agent is one or more selected from the group consisting of: one or more of salicylic acid, potassium salicylate, salicylamide, and acetylsalicylic acid.

5. The manufacturing method of a cocopeat substrate according to claim 1, wherein the modified diisocyanate is prepared by the steps of:

polymerizing diisocyanate and polyoxyethylene ether with a molar ratio of 1:(1-1.5) at a polymerization temperature of 50-60° C. for a polymerization reaction time of 5-6 hours.

6. The manufacturing method of a cocopeat substrate according to claim 4, wherein the modified diisocyanate is prepared by the steps of:

polymerizing diisocyanate and polyoxyethylene ether with a molar ratio of 1:(1-1.5) at a polymerization temperature of 50-60° C. for a polymerization reaction time of 5-6 hours.

7. The manufacturing method of a cocopeat substrate according to claim 5, wherein the diisocyanate is one or more selected from the group consisting of: toluene diisocyanate (TDI), isophorone diisocyanate (IPDI), diphenylmethane diisocyanate (MDI), dicyclohexylmethane diisocyanate (HMDI), hexamethylene diisocyanate (HDI), Lysine diisocyanate (LDI); and the polyoxyethylene ether is one or more selected from the group consisting of: fatty alcohol polyoxyethylene ether (AEO), and nonylphenol polyoxyethylene ether (NP-10).

8. The manufacturing method of a cocopeat substrate according to claim 6, wherein the diisocyanate is one or more selected from the group consisting of: toluene diisocyanate (TDI), isophorone diisocyanate (IPDI), diphenylmethane diisocyanate (MDI), dicyclohexylmethane diisocyanate (HMDI), hexamethylene diisocyanate (HDI), Lysine diisocyanate (LDI); and the polyoxyethylene ether is one or more selected from the group consisting of: fatty alcohol polyoxyethylene ether (AEO), and nonylphenol polyoxyethylene ether (NP-10).

9. The manufacturing method of a cocopeat substrate according to claim 1, wherein in step (b), the mold is configured to make the cocopeat substrate into a truncated square pyramid structure having a top side and a bottom side, a planting hole provided on the top side of the truncated square pyramid structure opening from the top side and extending downwardly towards the bottom side defining a depth of the planting hole, wherein the planting hole is a square hole in the middle of the top side with a dimension of 3 cm by 3 cm and the depth of the planting hole is 3 cm.

10. The manufacturing method of a cocopeat substrate according to claim 8, wherein in step (b), the mold is configured to make the cocopeat substrate into a truncated square pyramid structure having a top side and a bottom side, a planting hole provided on the top side of the truncated square pyramid structure opening from the top side and extending downwardly towards the bottom side defining a depth of the planting hole, wherein the planting hole is a square hole in the middle of the top side with a dimension of 3 cm by 3 cm and the depth of the planting hole is 3 cm.

11. The manufacturing method of a cocopeat substrate according to claim 1, wherein in step (b), the mold is configured to make the cocopeat substrate into a truncated rectangular pyramid structure having a top side and a bottom side, a planting hole provided on the top side of the truncated rectangular pyramid structure opening from the top side and extending downwardly towards the bottom side defining a depth of the planting hole, wherein the planting hole is a square hole in the middle of the top side with a dimension of 3 cm by 3 cm and the depth of the planting hole is 3 cm.

12. The manufacturing method of a cocopeat substrate according to claim 8, wherein in step (b), the mold is configured to make the cocopeat substrate into a truncated rectangular pyramid structure having a top side and a bottom side, a planting hole provided on the top side of the truncated rectangular pyramid structure opening from the top side and extending downwardly towards the bottom side defining a depth of the planting hole, wherein the planting hole is a square hole in the middle of the top side with a dimension of 3 cm by 3 cm and the depth of the planting hole is 3 cm.

* * * * *